(12) United States Patent
Hasenfratz et al.

(10) Patent No.: US 10,013,817 B2
(45) Date of Patent: Jul. 3, 2018

(54) PRESSURE-BASED PARKING DETECTION SYSTEM

(71) Applicant: Sensirion AG, Stafa (CH)

(72) Inventors: David Hasenfratz, Zurich (CH); Moritz Koehler, Zurich (CH); Michel Kinzer, Stafa (CH)

(73) Assignee: Sensirion AG, Stafa (CH)

( * ) Notice: Subject to any disclaimer, the term of this patent is extended or adjusted under 35 U.S.C. 154(b) by 0 days.

(21) Appl. No.: 15/287,415

(22) Filed: Oct. 6, 2016

(65) Prior Publication Data
US 2017/0103586 A1    Apr. 13, 2017

(30) Foreign Application Priority Data

Oct. 8, 2015 (EP) .................................... 15002876

(51) Int. Cl.
*G07C 5/00* (2006.01)
*G01L 13/00* (2006.01)
*G07C 5/08* (2006.01)

(52) U.S. Cl.
CPC .............. *G07C 5/008* (2013.01); *G01L 13/00* (2013.01); *G07C 5/085* (2013.01)

(58) Field of Classification Search
CPC ........ G07C 5/008; G01L 13/00; G07V 58/085
See application file for complete search history.

(56) References Cited

U.S. PATENT DOCUMENTS

2014/0232570 A1* 8/2014 Skinder ................ G01C 21/165
340/989

FOREIGN PATENT DOCUMENTS

| EP | 2871455 | 5/2015 |
| EP | 2871456 | 5/2015 |
| JP | 2008193497 A * | 8/2008 |

* cited by examiner

*Primary Examiner* — Yazan A Soofi
(74) *Attorney, Agent, or Firm* — Cooper & Dunham LLP

(57) ABSTRACT

The present invention is notably directed to computerized method for detecting parking-related events from a mobile device. The latter comprising a pressure sensor and a peak detection module. The method comprises: monitoring pressure sensor data from the pressure sensor, the pressure sensor data representative of a pressure variation over a period of time; and comparing the monitored pressure sensor data with reference pressure data corresponding to pressure variations over time as occurring inside a vehicle when, on the one hand, opening a door and, on the other hand, closing a door of this vehicle, to detect a corresponding pressure variation in the monitored pressure sensor data, in order to determine whether a vehicle has parked or has started, wherein the steps of monitoring and comparing are performed by the peak detection module, in the vehicle. The present invention is further directed to related devices and computer program products.

15 Claims, 7 Drawing Sheets

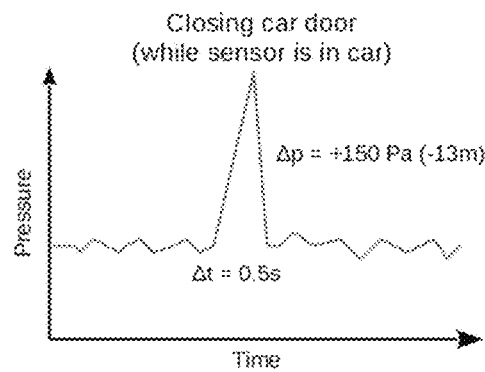
FIG. 6A
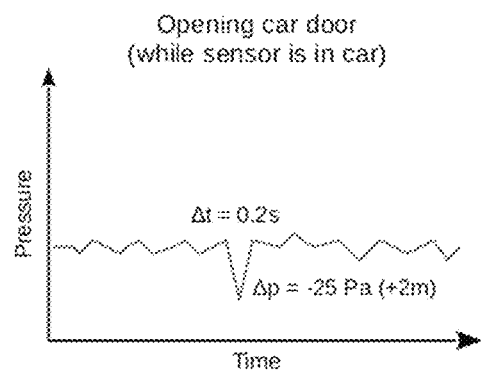
FIG. 6B
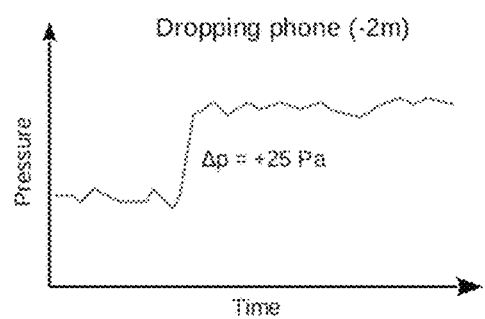
FIG. 6C
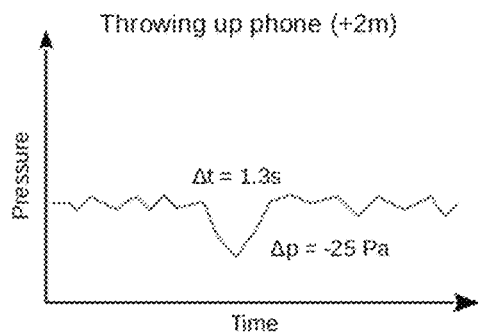
FIG. 6D
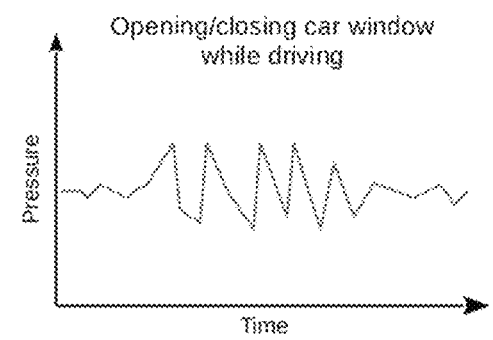
FIG. 6E
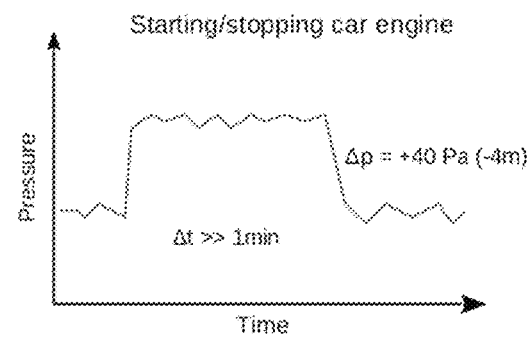
FIG. 6F
FIG. 6

PRESSURE-BASED PARKING DETECTION SYSTEM

BACKGROUND

The invention relates in general to computerized methods for detecting parking-related events for a vehicle. In particular, it is directed to a method for detecting parking-related events from a pressure sensor of a mobile device and such a mobile device.

Methods and systems are known, which make it possible to detect parking-related events, e.g., a user getting in or out of her/his car. This is typically achieved by using a GPS navigation device. However, these methods and systems have the following drawbacks. Some of the known methods are accurate and provide real-time event detection, using GPS navigation. However, it can be realized that such methods require high power consumption, because they involve power intensive sensors or components (like GPS) that need to be constantly on. Other methods offer lower power consumption. This, however, comes at a price in terms of accuracy. For example, a GPS navigation system is switched on intermittently, e.g., once every few minutes, which results in missing the exact context change from driving to walking and thus the exact parking location. Still other methods are known, which involve complex algorithms, such that computation needs be performed remotely, a thing that is not always possible in real-time and may impair the accuracy.

A simple solution is therefore needed, which makes it possible to detect parking-related events in real-time, while having low power consumption.

SUMMARY

According to a first aspect, the present invention is embodied as a computerized method for detecting parking-related events from a mobile device, the latter comprising a pressure sensor and a peak detection module. The method comprises: monitoring pressure sensor data from the pressure sensor, the pressure sensor data representative of a pressure variation over a period of time; and comparing the monitored pressure sensor data with reference pressure data corresponding to pressure variations over time as occurring inside a vehicle when, on the one hand, opening a door and, on the other hand, closing a door of this vehicle, to detect a corresponding pressure variation in the monitored pressure sensor data, in order to determine whether a vehicle has parked or has started. The steps of monitoring and comparing are performed by the peak detection module, i.e., in a processing element of the mobile device.

Thus, the above solution primarily relies on a pressure sensor and does hence not require constant monitoring of a power intensive unit like a GPS receiver. The pressure sensor can be constantly on, which ensures an accurate tracking of the parking-related events detection. In addition, a simple peak detection algorithm can be adopted, which requires minimal power consumption. Thus, the peak detection does not necessarily need to be performed at a main processing element (e.g., an application processor) of the mobile device. In other words, the present solutions allows a simple, low power and real-time event detection to be obtained.

In embodiments, the mobile device further comprises an event detection module and the method further comprises: accessing additional data, the latter comprising one or more of: position data; displacement data; motion sensor data; and one or more previously detected parking-related events. Upon being notified by the peak detection module that a pressure variation was detected in the pressure sensor data, a computerized data analysis is triggered based on the additional data accessed (or possibly based on both the pressure sensor data, or pressure data derived therefrom, and the additional data accessed), to confirm whether the vehicle has effectively parked or started. The additional steps of accessing and triggering are performed by the event detection module, i.e., in (or at least from) the mobile device.

Note that, even if a power intensive data source (like GPS) is involved at this point, the need for power-intensive data collection is only intermittent and therefore limited, as the prior pressure peak detection algorithm already ensures filtering out the meaningless pressure events. Namely, only meaningful pressure events are considered for confirmation.

Preferably, the computerized data analysis triggered for confirmation is performed by the event detection module, i.e., in the mobile device. The simplicity of the confirmation process normally allows for computation in-situ.

In preferred embodiments, the mobile device further comprises one or more of: (i) a motion sensor, configured to produce said motion sensor data, the latter representative of a proper acceleration of the mobile device; (ii) a localization module, such as a GPS module, configured to produce the position data and/or displacement data; and (iii) a logfile, the later stored on the mobile device and comprising one or more previously detected parking-related events logged thereon.

Preferably, the method further comprises: refining parameters used for comparing the monitored pressure sensor data with the reference pressure data, based on an outcome of the triggered computerized data analysis, confirming whether the vehicle has effectively parked or started. This way, a self-learning process is achieved, which results in improving the upfront pressure sensor algorithm.

In embodiments, the mobile device further comprises one or more processors and a sensor hub, the latter operatively connected to the one or more processors and configured for processing data from a set of sensors of the mobile device, said set comprising said pressure sensor, to off-load processing from the one or more processors. The steps performed by the peak detection module and the event detection module are at least partly implemented at the sensor hub.

In embodiments, the mobile device further comprises an integrated circuit component carrying the pressure sensor, the integrated circuit component operatively connected to the one or more processors, e.g., via a sensor hub of the mobile device. The integrated circuit component is configured for processing data from the pressure sensor, to off-load processing from other processing elements of the mobile device (e.g., the one or more processors, the sensor hub). The steps performed by the peak detection module and the event detection module may thus at least partly be implemented at the integrated circuit component.

In variants, the steps performed by the peak detection module and the event detection module may at least partly be implemented both at the integrated circuit component and at the sensor hub, to off-load processing from a main processing location of the mobile device.

In preferred embodiments, the method further comprises, if it is confirmed that the vehicle has parked or that the vehicle has started, generating a corresponding event and proceeding to do one or more of: (i) storing the generated event in a logfile on the mobile device; (ii) forwarding the generated event to one or more processors of the mobile device; and (iii) forwarding the generated event to one or more applications and/or services running on the mobile device.

Preferably, generating said corresponding event comprises, prior to storing the generated event: aggregating position data estimating a position of the mobile device as the vehicle was confirmed to have parked or started. More preferably, the aggregated position data comprise data accessed while accessing said additional data and the position data accessed are position data obtained from a localization module, such as a GPS module, of the mobile device or of the vehicle. Again, GPS data are, however, sparingly collected.

In embodiments, the method further comprises, after storing the generated event: running an application on the mobile device, said application assisting a user of the mobile device in finding a parking spot corresponding to position data that estimates the position of the mobile device as the vehicle was confirmed to have parked.

The reference pressure data used by the peak detection module may typically be representative of:

On the one hand, a negative pressure peak between −12 and −50 Pa, over a period of time between 0.1 and 0.4 s, as may occur inside a vehicle when opening a door thereof (for detecting that a vehicle has parked/a user is getting out of the vehicle); and On the other hand, a positive pressure peak between +100 and +200 Pa, over a period of time between 0.25 and 1.00 s, as may occur inside a vehicle when closing a door thereof (for detecting that a vehicle has started/a user has entered the vehicle).

Interestingly, such variations involve single (positive or negative) pressure peaks, which, it can be realized, result from opening or closing a door of a vehicle. Such variations make it easy to discriminate between various kind of pressure variation signatures as generated by events likely to be sensed by the pressure sensor.

According to another aspect, the invention is embodied as a mobile device comprising a pressure sensor and a peak detection module, consistently with the above methods. The peak detection module is configured for: monitoring pressure sensor data from the pressure sensor, the pressure sensor data representative of a pressure variation over a period of time; and comparing the monitored pressure sensor data with reference pressure data corresponding to pressure variations over time as occurring inside a vehicle when, on the one hand, opening a door and, on the other hand, closing a door of this vehicle, to detect a corresponding pressure variation in the monitored pressure sensor data, in order to determine whether a vehicle has parked or has started.

Preferably, and consistently with embodiments of the above method, the mobile device further comprises an event detection module, the event detection module configured for: accessing additional data, the latter comprising one or more of: position data; displacement data; motion sensor data; and one or more previously detected parking-related events; and upon being notified by the peak detection module that a pressure variation was detected in the pressure sensor data, triggering a computerized data analysis based on the additional data accessed, to confirm whether the vehicle has effectively parked or started.

In embodiments, the mobile device further comprises a learning module, operatively connected to the event detection module and the peak detection module, the learning module configured to refine parameters used by the peak detection module for comparing monitored pressure sensor data with reference pressure data, based on outcomes of computerized data analyses triggered by the event detection module.

According to a final aspect, the invention may be embodied as a computer program product for detecting parking-related events from a mobile device such as evoked above, the computer program product comprising a computer readable storage medium having program instructions embodied therewith, the program instructions executable by the peak detection module to cause the latter to: monitor pressure sensor data from the pressure sensor, the pressure sensor data representative of a pressure variation over a period of time; and compare the monitored pressure sensor data with reference pressure data corresponding to pressure variations over time as occurring inside a vehicle when, on the one hand, opening a door and, on the other hand, closing a door of this vehicle, to detect a corresponding pressure variation in the monitored pressure sensor data, in order to determine whether a vehicle has parked or has started.

Devices, methods and computer program products embodying the present invention will now be described, by way of non-limiting examples, and in reference to the accompanying drawings.

BRIEF DESCRIPTION OF SEVERAL VIEWS OF THE DRAWINGS

FIG. 6 (FIGS. 6A-6F) shows plots of typical pressure variation fingerprints of various pressure events, including events such as depicted in FIGS. 4 and 5, which may be used to detect a parking-related event, according to embodiments;

Figure 1A:
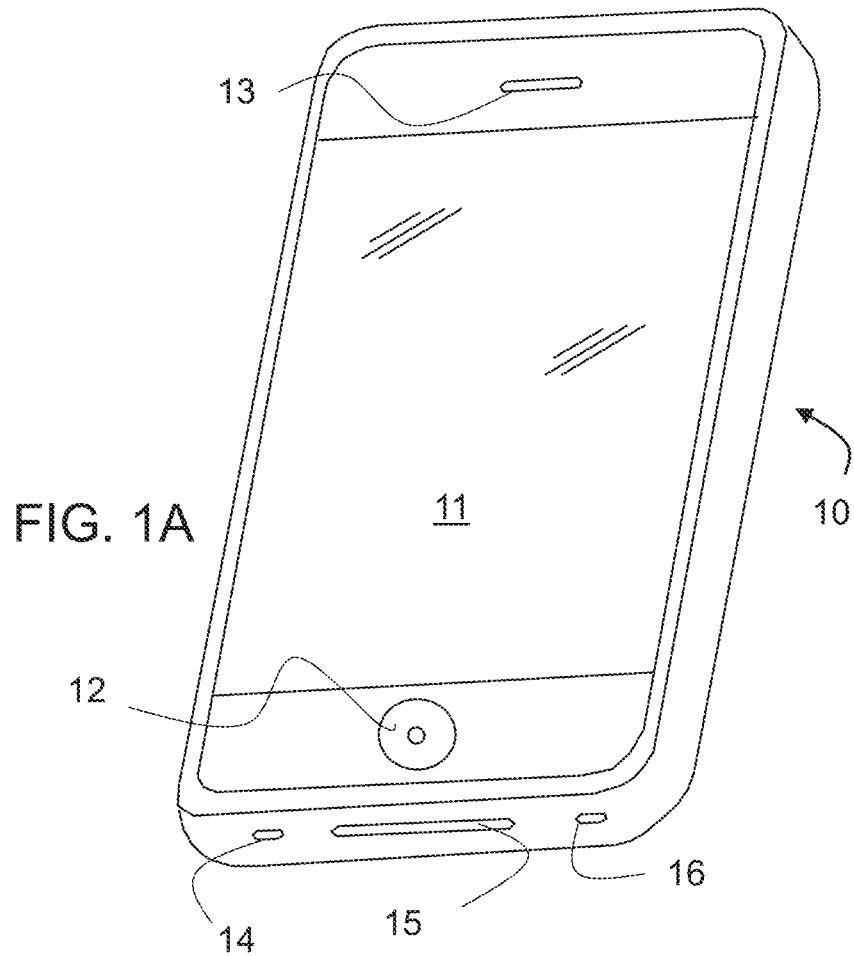
FIGS. 1A and 1B are 3D views of a smartphone, comprising a peak detection module and a sensor hub, according to embodiments.

The accompanying drawings show simplified representations of computerized devices (or parts thereof) and methods as involved in embodiments. Technical features depicted in the drawings are not necessarily to scale. Similar or functionally similar elements in the figures have been allocated the same numeral references, unless other-wise indicated.

DETAILED DESCRIPTION OF EMBODIMENTS OF THE INVENTION

The following description is structured as follows. First, general embodiments and high-level variants are described (sect. 1). The next section addresses more specific embodiments and technical implementation details (sect. 2).

1. General Embodiments and High-Level Variants

Figure 7:
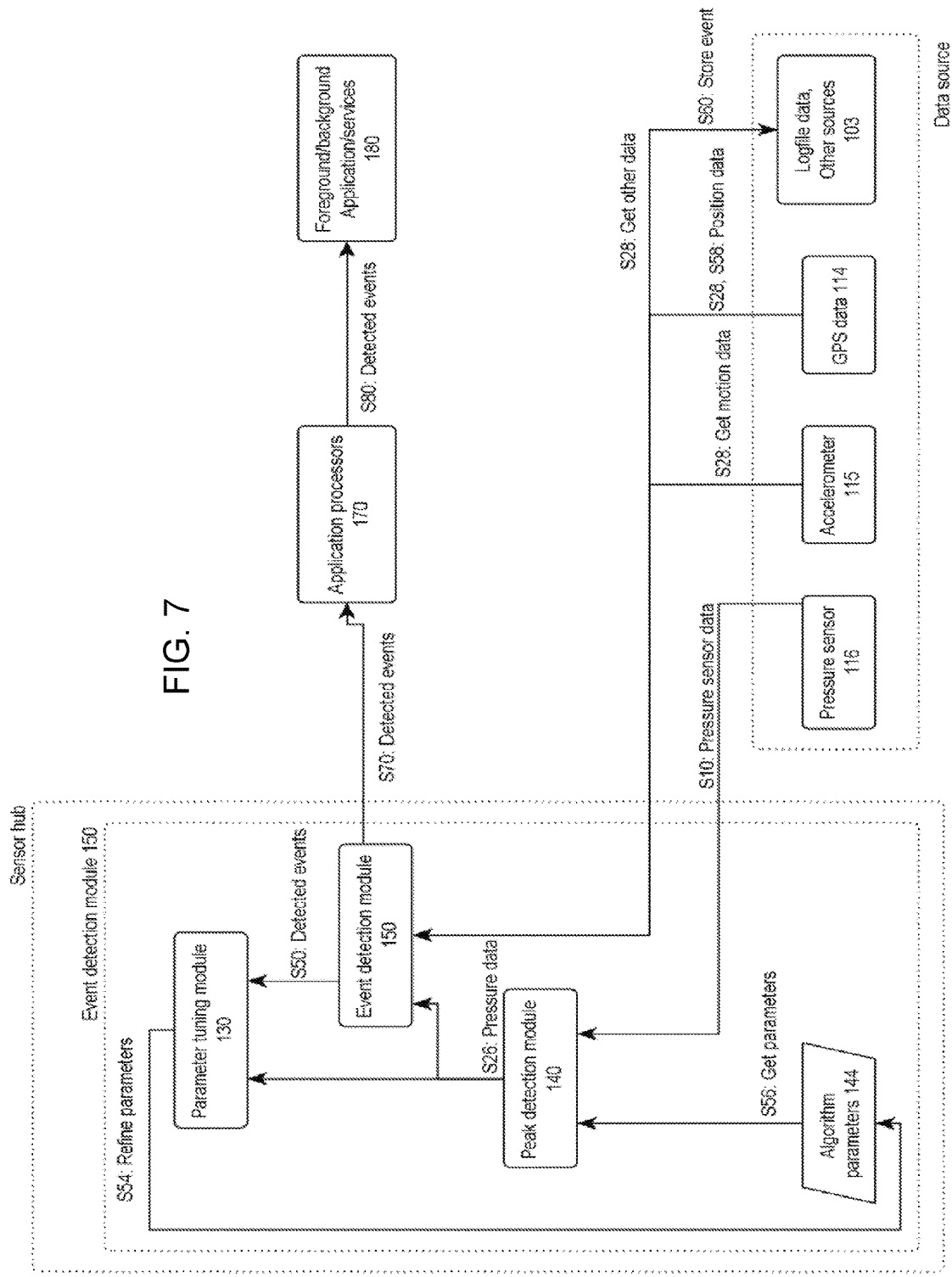
FIG. 7 is a block diagram schematically illustrating selected components and modules of a mobile device, according to embodiments.
Figure 8:
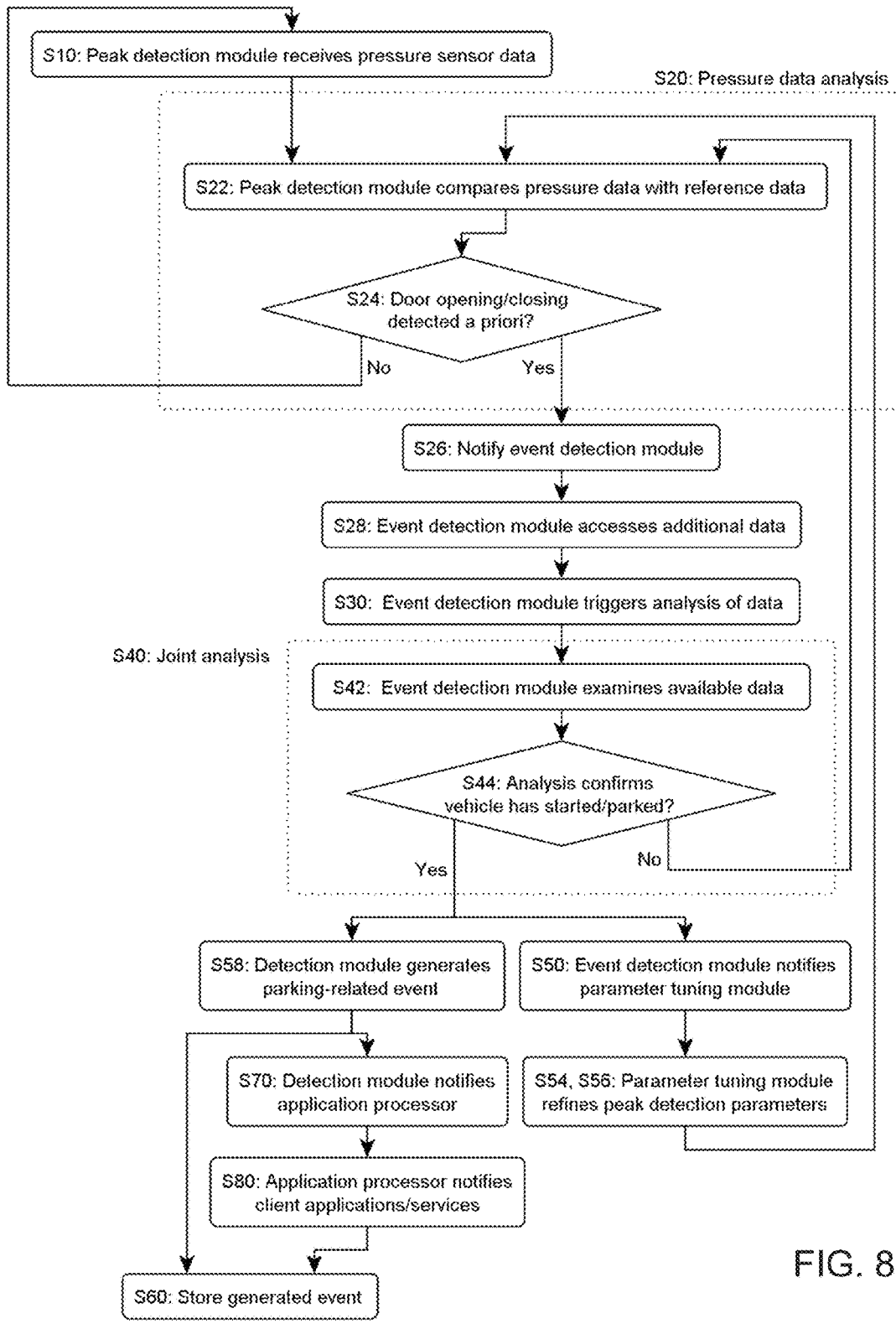
FIG. 8 is a flowchart illustrating high-level steps of a method for detecting parking-related events from a mobile device, as in embodiments.

In reference to FIGS. 1-8, with emphasis put on FIGS. 7 and 8, an aspect of the invention is first described, which concerns a computerized method for detecting parking-related events from a mobile device 10. The mobile device 10 notably comprises a pressure sensor 116 and a peak detection module 140. Basically, the present methods first involve a step of monitoring (step S10, FIG. 8) pressure sensor data from the pressure sensor 116. The pressure sensor data are representative of a pressure variation over a given period of time. Then, the monitored pressure sensor data are com-pared S22 with reference pressure data. The reference pressure data correspond to pressure variations over time as typically occurring inside a vehicle 1 (FIGS. 4 and 5) when, on the one hand, opening a door and, on the other hand, closing a door of a vehicle. The reference pressure data used may comprise different datasets, e.g., at least two datasets, reflecting typical pressure variation signatures for the above events (opening and closing a door of a vehicle). More datasets may be used, reflecting events such as depicted in FIG. 6, to help discriminating among possible events. In all cases, the comparison performed at step S22 allows an actual pressure variation, which a priori corresponds to one or the other occurrence (opening or closing a door of a vehicle) to be detected S24 in the monitored pressure sensor data. Eventually, this makes it possible to determine S24, and possibly confirm (steps S42, S44 in FIG. 8) whether a vehicle 1 has parked or has started. Note that such events are determined in isolation, i.e., each occurrence (opening or closing a door of a vehicle) is a separate event, which is individually detected. The above steps of monitoring and comparing are, each, performed by the peak detection module 140, that is, by one or more processing elements of the mobile device.

Figure 10:
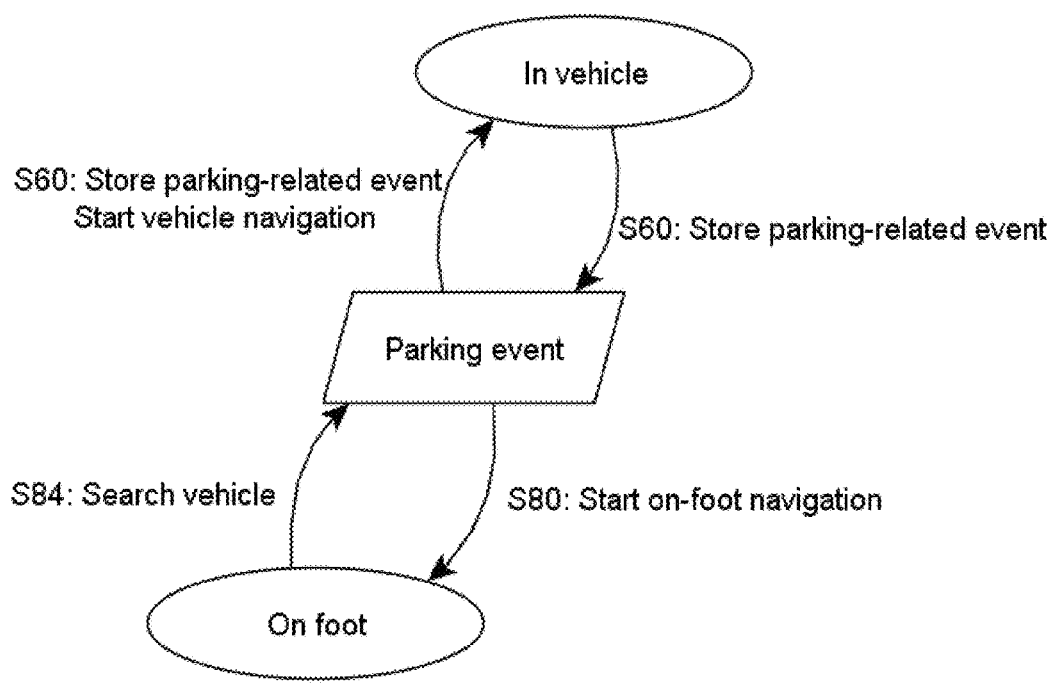
FIG. 10 is a state diagram illustrating possible activities of a user in respect of parking events as determined according to embodiments.

The detected events may subsequently be logged, such that an application or a service of the mobile device can later on advantageously re-use such data, as discussed later in reference to FIGS. 2 and 10.

The mobile device is normally carried by the user (and thus is inside the vehicle when the user is inside the vehicle) or placed by the user in the vehicle, e.g., while driving. Thus, the mobile device can adequately serve as a carrier for a pressure sensor, to detect parking-related events. The mobile device can notably be a wearable smart device such as a smartphone (FIG. 1) or a smartwatch (FIG. 2). It may also, more generally, be a portable digital assistant (or PDA) or, even, a laptop. Preferably though, the mobile device is a pocket device, or a handheld device, or an information appliance, typically small enough to be easily carried by a user. An exemplary mobile device and the possible arrangement of the pressure sensor therein are discussed in more details in Sect. 2.

Figure 4:
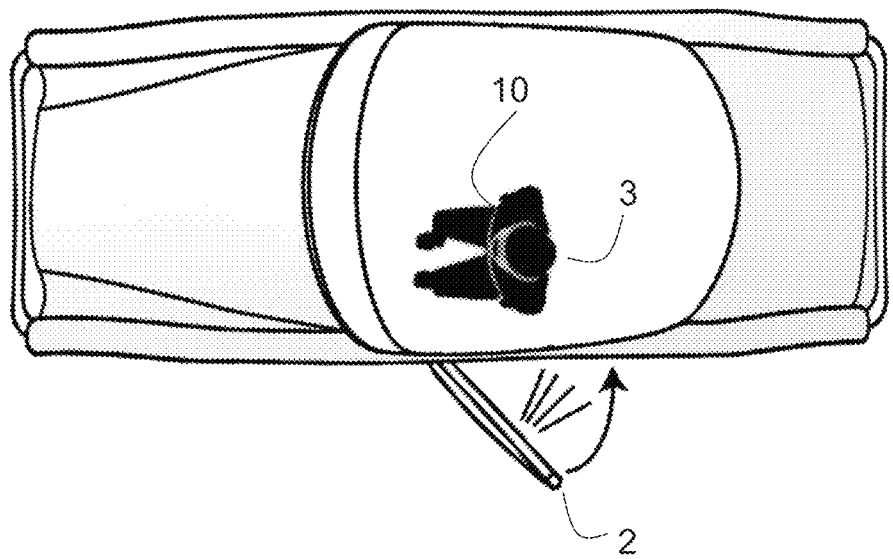
FIGS. 4 and 5 show, each, a top view of a vehicle, while closing or opening a door of this vehicle, as involved in embodiments.
Figure 5:
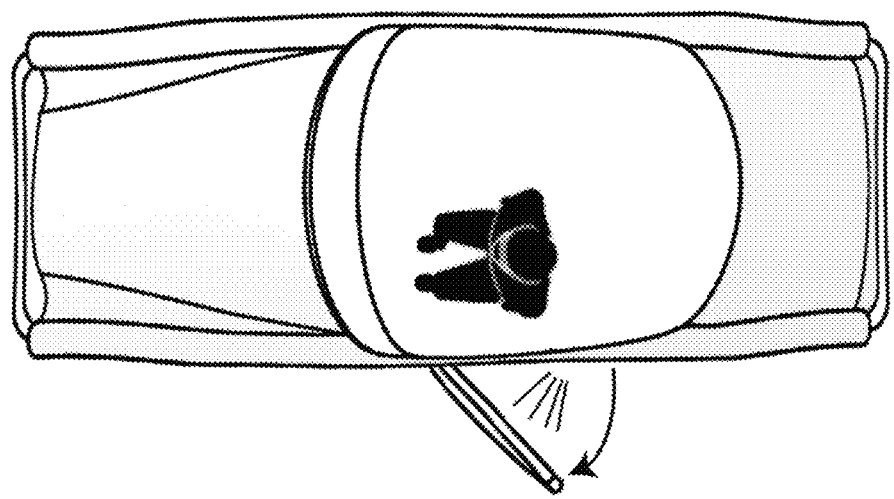

In the present methods, computerized analysis is based on data produced in output by the pressure sensor. The pressure sensor data are monitored S10 by the peak detection module 140, which typically windows datasets it receives to perform the comparisons. The comparison S22 performed by the peak detection module is to be understood in a broad sense: this comparison consists in analyzing datasets received to recognize pre-determined pressure variation fingerprints (i.e., peak signatures) therein. Peak analysis is known per se; it only requires modest computational resources, which a mobile device can normally afford. The comparison S22 allows pressure peaks to be identified S24, which peaks typically coincide with parking-related events as illustrated in FIGS. 4 and 5. Although the reference data used for comparison may correspond to and therefore include various signatures or patterns (including closing and opening the door), it is understood that, if a comparison with a first one of these signatures already makes it possible to conclude to a parking-related event, there is no strict need for the algorithm of step S20 to proceed to comparisons to additional signatures or patterns the reference data comprise.

Only a pressure sensor and a processing element implementing the peak detection algorithm (that is, the algorithm implemented by the peak detection module) need be on. Thus, the present solution primarily relies on a pressure sensor 116 and does not require switching on and monitoring a more power intensive source, such as a GPS unit. A pressure sensor 116 is substantially less power intensive than a GPS chip. In addition, a simple peak detection algorithm is needed, allowing minimal power consumption. As a result, the peak detection algorithm can be implemented 'close' to the pressure sensor, e.g., at a sensor hub 118 (FIG. 1) or, even, directly on the chip 117 carrying the pressure sensor. Thus, the peak detection does not necessarily require waking up a main processing element 120 (e.g., an application processor) of the mobile device. In other words, present methods allow a simple, low power, real-time event detection to be obtained. Still, the moment in time at which a door is closed or opened can be accurately tracked as outputs of the (always on) pressure sensor are monitored.

Notwithstanding, a more comprehensive data analysis S40, involving additional data, may be triggered at a later stage to confirm whether the vehicle has indeed parked or started, as discussed below in detail. This comprehensive analysis S40 may involve sparingly collecting data from other sources, like GPS data. However, since the prior pressure peak detection algorithm S20 already ensures that meaningless pressure events are discarded (only the "serious" pressure events are considered), the need for more power-intensive data collection (such as GPS data collection) is only intermittent and therefore limited. Even, a well-parameterized algorithm S20 may be self-sufficient, in which case the subsequent comprehensive analysis S40 may be skipped, or not necessary. To that aim, automatic learning techniques may be applied, in order to refine the parameter sets used by the upfront algorithm S20.

The comprehensive analysis S40 is now discussed in detail. In embodiments, the mobile device 10 further comprises an event detection module 150. The latter is suitably configured in the mobile device in order to access S28 additional data, which are needed for the complementary analysis S40. Such data may notably be of the following types: position data and/or displacement data; motion sensor data; and one or more previously detected parking-related events. Using part or all of such types of data will prove advantageous to confirm a previously detected S20 event. Upon being notified S26 by the peak detection module 140 that a substantial pressure variation was detected S24 in a set of pressure sensor data, the event detection module triggers S30 a comprehensive, computerized data analysis S40 (steps S42, and S44 in FIG. 8), based S42 on the additional data accessed S28, to confirm S44 whether the vehicle has effectively parked or started. If necessary, this analysis S40 may use both the pressure sensor data set for which a significant variation was detected (or any suitable set of data derived therefrom) and the additional data accessed, i.e., the pressure data and the additional data are merged by the algorithm S40 to confirm the event, using a refined algorithm, possibly involving a more sophisticated analysis.

Figure 1B:
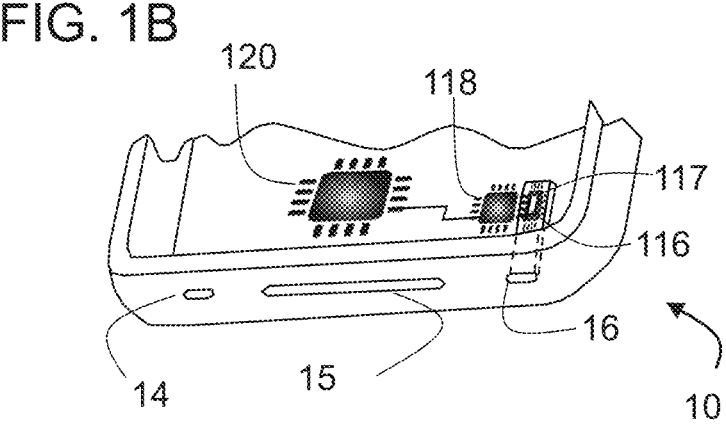

The steps of accessing and triggering are performed by the event detection module 150, which, again, may be implemented close to the pressure sensor, e.g., at a sensor hub 118 or at an IC chip 117 carrying the pressure sensor 116 (FIG. 1B).

In principle, the additional data may be accessed S28 prior to or just after step S26. However, the event detection module 150 should preferably attempt to access S28 those additional data only after having received the notification S26, to save resources. This is especially true if a power intensive resource (e.g., GPS) is activated for the complementary analysis S40.

Not all of the types of data mentioned above may be required for the analysis S40. The additional data used S40 may for instance be produced by a motion sensor, e.g., an accelerometer or a gyroscope, which is less power-intensive than a GPS receiver. Still, a GPS receiver may be momentarily turned on, to safely check whether successively sampled position data and/or displacement data confirm that the vehicle has parked or started.

Note that the event detection module 150 (or a service or an application implementing it) may require pre-configuration steps from the user of the mobile device, e.g., to be allowed access to other applications, or components and/or data that they produce, e.g., position data produced by a GPS receiver, or acceleration data from an accelerometer, etc.

Preferably, the computerized data analysis is performed S40 by the event detection module 150 itself, e.g., at a sensor hub 118 or directly at the pressure sensor chip 117, the algorithm complexity permitting. This way, all the required analyses can be performed without involving the main processing element 120 of the mobile device, to reduce power consumption.

In variants, the detection module 150 may momentarily "wake-up" the main processing element 120 to that aim. Should the algorithm S40 be too complex, other variants (less preferred) may provide that the detection module 150 be connectable, via the mobile device, to a remote server, for it to trigger a remote computerized analysis.

Reference is now more specifically made to FIG. 7. Consistently with the additional data that may be needed for the comprehensive analysis S40: the mobile device may, in embodiments, further comprise one or each of the following components: (i) a motion sensor 115, configured to produce the motion sensor data (the latter representative of a proper acceleration of the mobile device); (ii) a localization module, such as a GPS module, or a GPS receiver 114, configured to produce the position data and/or displacement data.

In variants, the mobile device 100 may access GPS data from an on-board GPS unit, to which the mobile may automatically connect, e.g., in a wireless fashion.

However, it is worth reminding that present methods do not require switching on a local GPS receiver upfront, i.e., in the mobile device, as a primary detection source. Although GPS data may sparingly be involved to confirm the parking events detected, the present solutions primarily rely on a pressure sensor. That is, the sensed pressure variations are the triggering events, not the GPS data.

The mobile device may also locally store a logfile 103, comprising previously detected parking-related events logged thereon, which events may be used to confirm S44 a detected S24 parking event. For example, if a previously logged event indicates that the last known status for the vehicle was "parked", it is less likely that a newly detected status be again "parked", even if a pattern corresponding to a door opening was recognized during the primary data analysis S20. Thus, previously logged events may be used as parameters for nuancing the primary analysis S20.

In embodiments, the additional data may be invoked only if the primary analysis S20 does not clearly allow to conclude. Furthermore, additional data may be invoked successively, and only if a prior stage of the analysis S40 is inconclusive. For example, previously logged events may be invoked only if the primary analysis S20 is inconclusive. Then, if the resulting analysis is still inconclusive, an additional analysis may be triggered by the event detection module 150, based on the motion sensor data. Finally, GPS data may be involved. In other embodiments, the complementary analysis S40 may be triggered solely based on the motion sensor data and/or the logfile 103 data, i.e., without involving any GPS data at all.

The examination S40 of the additional data is preferably done in a fully automatic manner, i.e., transparently for the user. In variants, a user confirmation as to whether the vehicle has effectively parked may be requested, for confirmation (no confirmation that the vehicle has started should be requested, for security reasons) and/or for refining the pressure peak detection S20 parameters.

As the skilled person may recognize, many algorithms can be contemplated, be it for the logic flow (FIGS. 7 and 8) or the data comparison/examination algorithms (S22, S42), in particular the pattern recognition involved at step S22, etc. Such algorithms may typically be refined by trial and error.

As evoked earlier, the additional data may be used for automatic learning purposes. Namely, these data may be used to refine parameters involved in the analysis S20 of the sole pressure data, as discussed now in reference to FIGS. 6-8. The comparison S22 of the monitored pressure sensor data with the reference pressure data typically comprises checking whether the monitored pressure sensor data are representative of a pressure variation that fulfills one or more given conditions. In that respect, present methods may further comprise, in embodiments, refining S50, S54, S56 said one or more conditions (e.g., parameters used in the corresponding algorithms), based S50 on an outcome of the complementary data analysis S40.

For example, the event detection module 150 may, upon completion of the complementary analysis S40, notify S54 a parameter tuning module 130 and altogether send an outcome of the analysis S40, as well as data initially used for this analysis. If the complementary analysis S40 concludes to a false positive, the parameter tuning module 130 may accordingly modify parameters of the parameter set 144 (FIG. 7) as used by the peak detection module 140 (e.g., threshold parameters as used in the set 144 may be revised). Thus, during a next pressure data analysis S20, the peak detection module will use updated parameters, which would less likely lead to false positives. A false positive means, in the present context, that a pressure-induced event was detected S24 but this event does finally not correspond to a car-parking event, according to the additional investigation S40 (e.g., based on GPS data).

Figure 9:
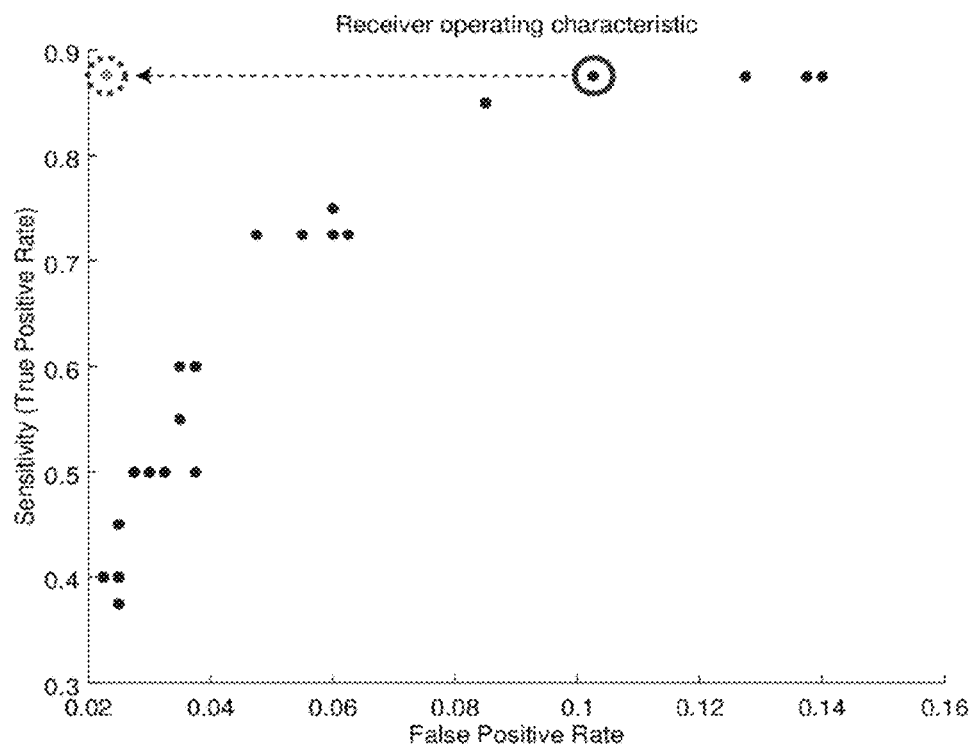
FIG. 9 is a plot illustrating how refining parameters of a peak detection algorithm may result in maximizing sensitivity (true positive rate) while keeping false positive rates low.

An automatic learning procedure can accordingly be obtained, which allows sensitivity to increase with the time (high true positive rate) while altogether decreasing the false positive rate, see FIG. 9. Over time, the event detection algorithm automatically learns optimal parameter settings, that is, parameters leading to high sensitivity with low false positive rate and minimized power consumption, it being understood that optimal parameter settings depend on many factors like: the users' habits, the mobile phone, the type of vehicle, where the user usually sits in the vehicle, etc.

In a particularly preferred embodiment, the pressure sensor readings S10 are used by the peak detection module 140 to classify pressure peaks corresponding to events of "getting in the car" and "getting out of the car". The parameter tuning module 130 adjusts S54 the parameters of the peak detection algorithm S20 such that the sensitivity (true positive rate) is maximized while keeping the false positive rates low. This is, in principle, difficult as high sensitivity usually goes hand in hand with an increasing number of false positives, as illustrated in FIG. 9 for different algorithm parameterizations. The parameter tuning module 130 may nevertheless optimize the algorithm parameters 144 such that the sensitivity be maximized, hence minimal number of events are missed. The event detection module 150 may furthermore substantially reduce the false positive rate by combining peak detection data with position/displacement/motion data to confirm that a detected S20 peak corresponds to a true parking-related event.

In practice, the algorithm parameters may be modified by adjusting the pressure thresholds over time. Assuming that the algorithm initially tries to detect pressure peaks of a certain amplitude, e.g., of about −50 Pa, and that an initial threshold of, e.g., −20 Pa is used, a progressive tuning mechanism may be implemented, which progressively lowers the threshold for the amplitude of the peaks, e.g., to −10 Pa. The peak detection algorithm S20 will accordingly become more sensitive and detect more peaks, and will therefore generate a higher number of false positives. However, the latter can be corrected, thanks to the additional analysis S40. Hence, and by successive trials and errors, the optimal sensitivity (leading to true positive rate) can be identified.

As evoked earlier, the mobile device may further comprise one or more processors 120 (or a main processor, e.g., an application processor) and a sensor hub 118. The sensor hub may notably be a microcontroller unit, a coprocessor or a DSP. As illustrated in FIG. 1B, the latter may be operatively connected to a main processor 120 and configured for processing data from a set of sensors of the mobile device 10, which set includes the pressure sensor 116, to off-load some of the processing from the processor 120, thus saving battery consumption. Thus, steps performed by the peak detection module and the event detection module may (at least partly) be implemented at the sensor hub 118.

Even, an integrated circuit (IC) component 117 carrying the pressure sensor 116 may be provided, which is operatively connected to the processor 120, e.g., via a sensor hub 118. The IC chip may similarly be configured for processing data from the pressure sensor 116, to off-load processing from the processor 120 and/or the sensor hub 118. I.e., steps performed by the peak detection module 140 and the event detection module 150 may be at least partly implemented at the IC component 117.

In more sophisticated embodiments, steps performed by the peak detection module 140 and the event detection module 150 may (at least partly) be implemented both at the IC circuit component 117 and at the sensor hub 118, in a distributed fashion, to off-load processing from the main processing location 120 of the mobile device 10.

Note that the sensor hub 118 may have direct access not only to pressure data produced by the sensor 116 but also to other data such as motion sensor data, such that steps S10 to S70 may all be performed from the sensor hub 188. I.e., the main processor 120 would only need to be waken up at step S70. More generally though, steps involved in the logic flow of FIG. 8 may be distributed among the various processing elements 117, 118, 120, the optimal distribution depending on the actual power consumption of each component.

It is understood that the event detection algorithm of steps S10-S70 may involve several submodules, logically interacting with each other, where part or all of these submodules may be implemented at any one or more of the processing elements 117, 118, 120. For completeness, steps S10-S70 may typically be instructed for execution from an application program, a service or even the operating system of the mobile device 10.

Once a parking-related event was confirmed, step S44, a message may be generated S58, which contains information about the detected event. This is preferably done by the event detection module 150, although this task may also be performed by another application or services of the mobile device 10. Once the corresponding message has been generated S58, it may be stored S60 in the logfile 103, on the mobile device 10, or forwarded S80 to the main processor 120 or, still, to other applications and/or services running on other processing components of the mobile device, if any. However, client applications or services will normally access the logged events via the main processor 120.

The generation S58 of the event is preferably performed by aggregating S58 position data, which estimate the position of the mobile device as the vehicle was confirmed to have parked or started, S44). The event message may for instance aggregate S58 data that were previously accessed at step S28, provided use was already made of such position data, to avoid re-activating the GPS device 114. If not, the GPS may be activated at step S58. Again, the GPS navigation device solicited may be a GPS module 114 of the mobile device 10 or of the vehicle 1.

To that aim, the event detection module 150 may for instance attempt to start an application of the mobile device that manages a GPS module thereof, to have access to position data. However, in variants, the event detection module 150 may access position data from a network provider, or network operator, e.g., localization may be obtained via multilateration of radio signals, by control plane locating, GSM localization, etc., as known per se. Such localization techniques are, however, typically less accurate than GPS localization. Self-reported positioning is preferably avoided, to favor a fully automatic system.

Typically, metadata may be stored along the event logged, e.g., the time and date as provided by a service of the mobile device. Thus, the generated S58 message may eventually contain information about the detected event, e.g., the type of event (parking/starting the car), a timestamp, position data, as well as metadata relating to, e.g., the probability of the event, its intensity, etc., which can in turn be used by the complementary analysis S40.

After that, the logged GPS location S60 can be re-used by an application or a service such that, e.g., the user can easily find the parking spot of her/his car, as now described in reference to FIGS. 2, 4, 5 and 10.

FIGS. 4 and 5 show a top view of car 1, while closing a door 2 of this vehicle (FIG. 4, as typically occurring after the driver 3 has entered the car 1) or opening the door 2 (FIG. 5, the driver 3 is about to get out of the car 1). Upon closing the door when entering the vehicle (FIG. 4), the pressure increases for a short time period, due to the generated air flow. This can be monitored by the peak detection module on the mobile device worn by the person getting into the vehicle. Note that, as long as the device is not in an airtight package, the pressure change is measurable. Upon opening the door (FIG. 5) when getting out of the vehicle, the pressure drops for a short time period, a phenomenon that can be monitored too. Again, the pressure change is measurable, as long as the device is not in an airtight package. In each case, the mobile device 10 of the user 3, who is inside the vehicle during the event, can sense a corresponding pressure event.

Assume, for instance, that the user 3 gets out S80 of the car 1, as in FIG. 5. The user has opened the door 2 and the event detection module 150 has accordingly logged S60 a parking event, as per embodiments as described above. After a while, the user may launch S84 an application on the mobile device 10, which application will assist the user in finding a parking spot corresponding to the last logged parking position, as illustrated in FIG. 2.

If, on the contrary, the complementary analysis S40 has confirmed S44 that the vehicle has started (as would typically occur short after the situation depicted in FIG. 4, present methods may proceed to automatically connect the mobile device to an on-board media system of the vehicle and/or increase the sampling rate of a GPS receiver of the mobile device to increase navigation accuracy.

Referring now to FIG. 6, the pressure data and analysis thereof are now discussed in detail. The reference pressure data may comprise several dataset, including a dataset representative of a negative pressure peak between −12 and −50 Pa, over a period of time between 0.1 and 0.4 s, as may occur inside a vehicle when opening a door thereof. This was confirmed by experiments conducted by the present inventors. The last digit used is indicative of the accuracy sought. Preferably, the analysis may try to identify pressure sensor data representative of a peak between −20 and −30 Pa, over 0.15 to 0.30 s. More preferably, one may seek, by default, to identify a pressure drop of about −25 Pa over a period of time of about 0.20 s.

Another dataset may be representative of a positive pressure peak between +100 and +200 Pa (or preferably between 125 and 175 Pa), over a period of time between 0.25 and 1.00 s (preferably between 0.4 and 0.6 s), as may occur inside a vehicle when closing a door of a vehicle. One notes that it is easier, a priori, to identify a door closing, so that different tolerances, threshold parameters, etc., may be used in that case. By default, the analysis may try to identify a pressure increase of about 150 Pa over a period of time of about 0.50 s.

However, these intervals vary noticeably depending on the type of pressure sensor used, the location of the pressure sensor in the smartphone, the location of the smartphone in the vehicle, the vehicle itself, etc. Therefore, implementing automatic learning methods as disclosed earlier proves advantageous for adapting to particular scenarios and maximizing the event detection accuracy.

Interestingly, the reference pressure variations shown in FIGS. 6A and 6B involve single (positive or negative) pressure peaks. Such variations make it easy to discriminate among various kinds of pressure variation signatures as generated by events likely to be sensed by the pressure sensor. Examples of typical pressure variation signatures recorded for such events are shown in FIG. 6, i.e., dropping a mobile phone (FIG. 6C), throwing up the phone (FIG. 6D), opening/closing a car window while driving (FIG. 6E), starting/stopping the engine (FIG. 6F).

Figure 2:
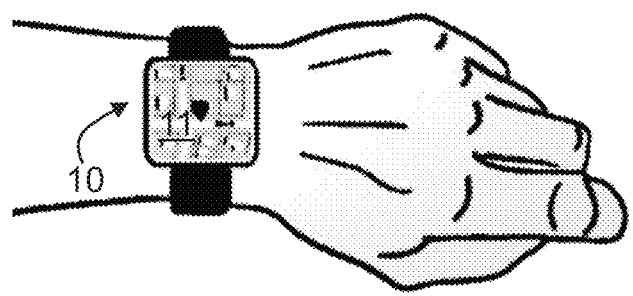
FIG. 2 shows a smartwatch, in operation, which implements a computerized method according to embodiments.
Figure 3:
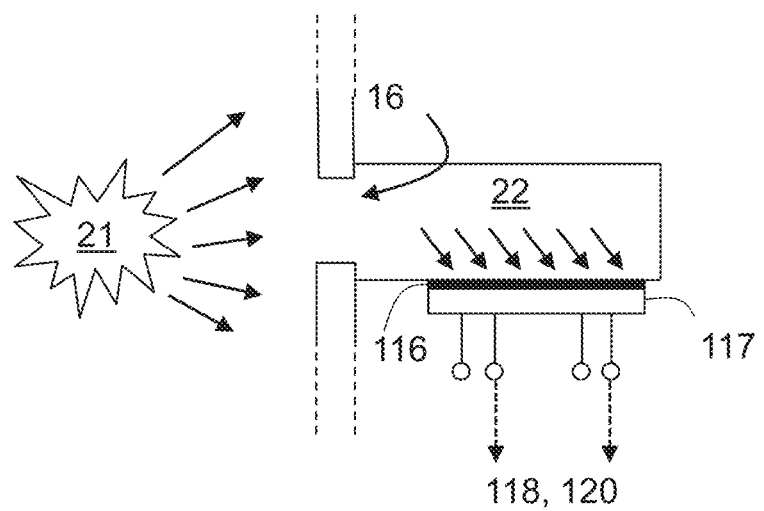
FIG. 3 is a 2D cross-sectional view depicting a pressure sensor, lodged in a cavity of a mobile device such as depicted in FIG. 1 or 2, according to embodiments.

Referring now to FIGS. 1, 2 and 7: according to another aspect, the invention can be embodied as a mobile device 10. The mobile device 10 comprises a pressure sensor 116 and a peak detection module 140, each configured so as to be able to perform steps as described above in reference to methods according to the invention.

In embodiments, the mobile device may further comprise an event detection module 150, to trigger and possibly perform the complementary analysis S40.

The mobile device may further comprise a learning module 130, operatively connected to the event detection module 150 and the peak detection module 140, so as to be able to refine parameters used by the peak detection module 140, based on outcomes of computerized data analyses S40 triggered by the event detection module 150.

Next, according to a final aspect, the invention can also be embodied as a computer program product for detecting parking-related events. This computer program product comprises a computer readable storage medium having program instructions embodied therewith, which instructions are executable by the peak detection module 140 to cause the latter to monitor S10 pressure sensor data and compare S22 the monitored pressure sensor data with reference pressure data, to detect S24 a corresponding pressure variation in the monitored pressure sensor data, in order to determine S42, S44 whether a vehicle 1 has parked or has started, consistently with principles discussed above in reference to FIGS. 7 and 8. Aspects related to computer program product implementations are further discussed in sect. 2.

The above embodiments have been succinctly described in reference to the accompanying drawings and may accommodate a number of variants. Several combinations of the above features may be contemplated. Examples are given below and in the next section.

In a particularly preferred embodiment, a low power, real-time event detection system is provided that merges pressure and motion sensor data to detect events of entering and leaving a vehicle. The pressure sensor 116 is used to sense the air flow generated when opening the door 2 and when closing the door of a vehicle 1 (FIGS. 4 and 5). The fusion with motion sensor data enables a system with high sensitivity (high true positive rate) while having at the same time a very low false positive rate. Over time, the event detection algorithm automatically learns the optimal parameter settings.

This detection system runs on a wearable smart device (e.g., smartphone, as in FIG. 1, or a smartwatch, as in FIG. 2) and informs applications and services running on the device 10 when detecting an event of entering or leaving a vehicle. Applications and services can use this information to intelligently react on the context change, e.g., automatically connect to the on-board media system when getting into the vehicle, increase the sampling rate of the GPS receiver when getting into the vehicle to increase navigation accuracy, and store the GPS location, upon getting out of the vehicle, such that the driver may later on easily find the parking spot of her/his vehicle.

The event detection algorithm runs on a low power, always-on sensor hub. The event detection is possible with high accuracy but low power consumption. Upon detecting an event, the sensor hub wakes up the application processor, which distributes the event to registered applications and services, e.g., to a service keeping track of the vehicle's parking location, which can in turn be used by an application, etc.

2. Specific Embodiments/Technical Implementation Details 2.1 Pressure Sensors and Location Thereof within the Mobile Device The mobile device can notably be a wearable smart device such as a mobile phone (FIG. 1) or a smartwatch (FIG. 2).

The device of FIG. 1A is here assumed to be a mobile phone. The housing of the mobile phone includes a front side with a screen 11 and elements like buttons 12 to let a user interact with the phone. Also shown on the front side is an opening 13 for a loud-speaker. Further openings 14, 15 are located at a lower sidewall of the housing. It is known to mount components like microphones and loudspeakers behind such openings. Another opening 16 is located at the lower sidewall. As shown in FIG. 1B the opening 16 is linked to a tubular duct passing through the interior of the housing. A pressure sensor 116 is mounted along the duct such that a sensitive area of the sensor is exposed to air 22 in a cavity formed inside the duct, which communicate with air outside the opening 16, so as for the pressure sensor to sense pressure variations 21 initially occurring outside the opening 16 and propagating inside the duct. The actual size and shape of the duct may depend on the volume available therefor in the mobile device and the nature of the sensor 116, which can vary. However, given the physical constraints of portable mobile devices, the diameter of the opening is typically less than 2 mm (and in the present example actually about 1 mm).

The pressure sensor 116 may be embodied as any suitable pressure sensor, e.g., a capacitive, diaphragm-based pressure sensor, a piezoelectric pressure sensor or a sensor using a piezoresistive strain gauge. Preferred pressure sensors are for instance described in patent application EP2871455 and EP2871456.

In general, low power and ultra-low power sensors are preferred. More generally, any pressure sensor may convene, it being noted that a typical pressure sensor typically consumes between 500 and 2000 times less power than a typical accelerometer and between 5000 and 20000 times less power than a typical GPS unit.

As the dimensions of the opening and the inner volume of the duct may lessen pressure variations at the level of the sensor 116, the peak detection module 140 and/or the event detection module 150 may be provided with algorithms that compensate for this effect, e.g., by rescaling peak intensities. The data sets used for the comparison S22 may also be adapted to the particular configuration of the sensor in the mobile device.

As depicted in FIG. 1B, a preferred arrangement is one where the sensor 116 is mounted on a chip 117, which connects to a sensor hub 118, itself connected to a main processor 120 of the mobile phone 10.

2.2 Computerized Mobile Devices and Computer Program Products

Computerized devices can be suitably designed for implementing embodiments of the present invention as described herein. In that respect, it can be appreciated that the methods described herein are essentially non-interactive, i.e., automated. The methods described herein can be implemented in software, hardware, or a combination thereof. In exemplary embodiments, the methods described herein are implemented in software, as a service or an executable program (e.g., application), the latter executed by suitable digital processing devices.

For instance, a typical mobile device 10 may include a processor 120 (FIG. 1B) and a memory coupled to a memory controller. The processor 120 is a hardware device for executing software, as e.g., loaded in a main memory of the device. The processor can be any custom made or commercially available processor. The chip 117 and the sensor hub may also be configured to execute computerized instructions.

The memory typically include a combination of volatile memory elements (e.g., random access memory) and non-volatile memory elements, e.g., a solid-state device. The software in memory may include one or more separate programs, each of which comprises an ordered listing of executable instructions for implementing logical functions. In the example of FIG. 8, the software in the memory includes methods described herein in accordance with exemplary embodiments and a suitable operating system (OS). The OS essentially controls the execution of other computer (application) programs and provides scheduling, input-output control, file and data management, memory management, and communication control and related services. It may further control the distribution of tasks to be performed by units 117, 118 and 120.

The methods described herein shall typically be in the form of executable program, script, or, more generally, any form of executable instructions.

The device 10 can further include a display controller coupled to a display 11. In exemplary embodiments, the device 10 can further include a network interface or transceiver for coupling to a network.

When the device 10 is in operation, one or more of the processing elements 117, 118, 120 are configured to execute software stored within the memory of the mobile device 10 (possibly separate memory elements can be dedicated to each processing element 117, 118, 120), to communicate data to and from the memory, and to generally control operations pursuant to software instruction. The methods described herein and the OS, in whole or in part are read by one or more of the processing elements, typically buffered therein, and then executed. When the methods described herein are implemented in software, the methods can be stored on any computer readable medium for use by or in connection with any computer related system or method.

Computer readable program instructions described herein can be downloaded to processing elements from a computer readable storage medium, via a network, for example, the Internet and/or a wireless network. A network adapter card or network interface in the device may receive the computer readable program instructions from the network and forwards the program instructions for storage in a computer readable storage medium interfaced with the processing elements.

Aspects of the present invention are described herein notably with reference to a flowchart and a block diagram. It will be understood that each block, or combinations of blocks, of the flowchart and the block diagram can be implemented by computer readable program instructions.

These computer readable program instructions may be provided to one or more processing elements as described above, to produce a machine, such that the instructions, which execute via the one or more processing elements create means for implementing the functions or acts specified in the block or blocks of the flowchart and the block diagram. These computer readable program instructions may also be stored in a computer readable storage medium.

The flowchart and the block diagram in the accompanying drawings illustrate the architecture, functionality, and operation of possible implementations of the mobile device 10, methods of operating it, and computer program products according to various embodiments of the present invention. Note that each block in the flowchart or the block diagram may represent a module, or a portion of instructions, which comprises executable instructions for implementing the functions or acts specified therein. In variants, the functions or acts mentioned in the blocks may occur out of the order specified in the figures. For example, two blocks shown in succession may actually be executed in parallel, concurrently or still in a reverse order, depending on the functions involved and the algorithm optimization retained. It is also reminded that each block and combinations thereof can be adequately distributed among special purpose hardware components.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, the modules 130, 140 and 150 may actually be implemented as only one module, as two modules, or more generally as more than three modules, depending on the actual implementation chosen.

What is claimed is:

1. A computerized method for detecting parking-related events from a mobile device, the latter comprising a pressure sensor and a peak detection module, the method comprising:
    monitoring pressure sensor data from the pressure sensor, the pressure sensor data representative of a pressure variation over a period of time; and
    comparing the monitored pressure sensor data with reference pressure data corresponding to pressure variations over time as occurring inside a vehicle when, on the one hand, opening a door and, on the other hand, closing a door of this vehicle, to detect a corresponding pressure variation in the monitored pressure sensor data, in order to determine whether a vehicle has parked or has started,
wherein,
    the steps of monitoring and comparing are performed by the peak detection module.

2. The computerized method according to claim 1, the mobile device further comprising an event detection module, the method further comprising:
    accessing additional data, the latter comprising one or more of: position data; displacement data; motion sensor data; and one or more previously detected parking-related events; and
    upon being notified by the peak detection module that a pressure variation was detected in the pressure sensor data, triggering a computerized data analysis based on the additional data accessed, to confirm whether the vehicle has effectively parked or started,
wherein,
    the steps of accessing and triggering are performed by the event detection module.

3. The computerized method according to claim 2, wherein:
    the computerized data analysis is performed by the event detection module.

4. The computerized method according to claim 2, wherein the mobile device further comprises one or more of:
    a motion sensor, configured to produce said motion sensor data, the latter representative of a proper acceleration of the mobile device;
    a localization module, configured to produce the position data and/or displacement data; and
    a logfile, the latter stored on the mobile device and comprising one or more previously detected parking-related events logged thereon.

5. The computerized method according to claim 2, wherein the method further comprises:
    refining parameters used for comparing the monitored pressure sensor data with the reference pressure data, based on an outcome of the triggered computerized data analysis, confirming whether the vehicle has effectively parked or started.

6. The computerized method according to claim 2, wherein
    the mobile device further comprises one or more processors and a sensor hub, the latter operatively connected to the one or more processors and configured for processing data from a set of sensors of the mobile device, said set comprising said pressure sensor, to off-load processing from the one or more processors, and wherein,
    steps performed by the peak detection module and the event detection module are at least partly implemented at the sensor hub.

7. The computerized method according to claim 2, wherein the mobile device further comprises
    an integrated circuit component carrying the pressure sensor, the integrated circuit component operatively connected to the one or more processors, and configured for processing data from the pressure sensor, to off-load processing from the one or more processors, and wherein,
    steps performed by the peak detection module and the event detection module are at least partly implemented at the integrated circuit component.

8. The computerized method according to claim 2, wherein the method further comprises:
    if it is confirmed that the vehicle has parked or that the vehicle has started, generating a corresponding event and proceeding to do one or more of:
        storing the generated event in a logfile on the mobile device;
        forwarding the generated event to one or more processors of the mobile device; and
        forwarding the generated event to one or more applications and/or services running on the mobile device.

9. The computerized method according to claim 8, wherein generating said corresponding event comprises, prior to storing the generated event:
    aggregating position data estimating a position of the mobile device as the vehicle was confirmed to have parked or started.

10. The computerized method according to claim 8, wherein the method further comprises, after storing the generated event:

running an application on the mobile device, said application assisting a user of the mobile device in finding a parking spot corresponding to position data that estimates the position of the mobile device as the vehicle was confirmed to have parked, said parking spot thus corresponding to a last logged parking position.

11. The computerized method according to claim 1, wherein the reference pressure data are representative of:
on the one hand, a negative pressure peak between −12 and −50 Pa, over a period of time between 0.1 and 0.4 s, as may occur inside a vehicle when opening a door thereof; and
on the other hand, a positive pressure peak between +100 and +200 Pa, over a period of time between 0.25 and 1.00 s, as may occur inside a vehicle when closing a door thereof.

12. A mobile device comprising a pressure sensor and a peak detection module, wherein the peak detection module is configured for:
monitoring pressure sensor data from the pressure sensor, the pressure sensor data representative of a pressure variation over a period of time; and
comparing the monitored pressure sensor data with reference pressure data corresponding to pressure variations over time as occurring inside a vehicle when, on the one hand, opening a door and, on the other hand, closing a door of this vehicle, to detect a corresponding pressure variation in the monitored pressure sensor data, in order to determine whether a vehicle has parked or has started.

13. A mobile device according to claim 12, further comprising an event detection module, the event detection module configured for:
accessing additional data, the latter comprising one or more of: position data; displacement data; motion sensor data; and one or more previously detected parking-related events; and
upon being notified by the peak detection module that a pressure variation was detected in the pressure sensor data, triggering a computerized data analysis based on the additional data accessed, to confirm whether the vehicle has effectively parked or started.

14. A mobile device according to claim 13, further comprising
a learning module, operatively connected to the event detection module and the peak detection module, the learning module configured to refine parameters used by the peak detection module for comparing monitored pressure sensor data with reference pressure data, based on outcomes of computerized data analyses triggered by the event detection module.

15. A computer program product for detecting parking-related events from a mobile device that comprises a pressure sensor and a peak detection module, the computer program product comprising a computer readable storage medium having non-transitory program instructions embodied therewith, the program instructions executable by the peak detection module to cause the latter to:
monitor pressure sensor data from the pressure sensor, the pressure sensor data representative of a pressure variation over a period of time; and
compare the monitored pressure sensor data with reference pressure data corresponding to pressure variations over time as occurring inside a vehicle when, on the one hand, opening a door and, on the other hand, closing a door of this vehicle, to detect a corresponding pressure variation in the monitored pressure sensor data, in order to determine whether a vehicle has parked or has started.

* * * * *